United States Patent [19]

Legille et al.

[11] Patent Number: 4,758,036
[45] Date of Patent: Jul. 19, 1988

[54] AUTOMATIC GRABBING DEVICE FOR HANDLING ARTICLES AND ROBOT EQUIPPED WITH SUCH A GRABBING DEVICE

[75] Inventors: Edouard Legille, Luxembourg; Emile Lonardi, L-Bascharage; Victor Kremer, Luxembourg, all of Luxembourg

[73] Assignee: Paul Wurth S.A., Luxembourg

[21] Appl. No.: 937,646

[22] Filed: Dec. 3, 1986

[30] Foreign Application Priority Data

Dec. 3, 1985 [LU] Luxembourg ............................ 86188

[51] Int. Cl.$^4$ .......................... B25J 15/02; B66F 9/18
[52] U.S. Cl. .................................. 294/86.4; 294/88; 294/104; 294/907; 901/30; 901/39
[58] Field of Search ....................... 294/86.4, 88, 87.1, 294/99.1, 902, 907, 106, 107, 104; 901/30, 39; 414/1, 4, 5, 235, 239, 730, 740, 749

[56] References Cited

U.S. PATENT DOCUMENTS

| 2,370,528 | 2/1945 | Fontaine | 294/106 |
| 3,586,176 | 6/1971 | Rackman et al. | |
| 3,604,745 | 9/1971 | Sinclair | 294/88 |
| 4,254,984 | 3/1981 | Abraham et al. | 294/88 |
| 4,318,562 | 3/1982 | Tompkins | 294/88 |
| 4,533,167 | 8/1985 | Johnson | 294/86.4 |

FOREIGN PATENT DOCUMENTS 0001686 9/1978 European Pat. Off. .
3312483 10/1984 Fed. Rep. of Germany .
2070868 9/1971 France .
2129086 5/1984 United Kingdom .

OTHER PUBLICATIONS

IBM Tech. Disclosure Bulletin, vol. 27, No. 7B, Dec. 1984, pp. 4294-4295, New York, U.S., R. L. Kayton et al: "Gripper with Integral Part".
IBM Tech. Disclosure Bulletin, vol. 28, No. 7, Dec. 1984, pp. 2992-2997, New York, USA, "End Effector with Diagonal & Rototional Compliene Mech.".

Primary Examiner—James B. Marbert
Attorney, Agent, or Firm—Fishman, Dionne & Cantor

[57] ABSTRACT

A grabbing device intended to be mounted on the end of the arm of a robot and comprising a plate equipped with a pair of claws mounted in facing relation on the plate, with one claw being slidably mounted on the plate and the other claw being pivotably mounted thereon. The fastening between the robot arm and the plate comprises first and second mutually parallel pivot axes ($Y_1$, $Y_2$), the pivot axes being perpendicular to the surface of the plate. The grabbing device of the present invention also includes a mechanism for pivoting the plate about at least one of the axes, a mechanism for blocking or releasing the plate relative to the other of the axes, and a sensor for measuring the pivoting angle of the plate about each of the axes ($Y_1$, $Y_2$). The grabbing device is particularly well suited for handling refractory bricks in a robotized apparatus for repairing a metallurigical convertor.

20 Claims, 3 Drawing Sheets

AUTOMATIC GRABBING DEVICE FOR HANDLING ARTICLES AND ROBOT EQUIPPED WITH SUCH A GRABBING DEVICE

BACKGROUND OF THE INVENTION

This invention relates to an automatic grabbing device for handling articles. More particularly, this invention relates to an automatic grabbing device which is mounted on the end of a control arm and which comprises a plate equipped with a pair of claws. The claws are mounted facing one another on the plate; with one claw being slidably mounted and the other claw being pivotably mounted. The invention also relates to a robot equipped with said grabbing device.

The present invention, although not being limited thereto in its utility, relates more particularly to a grabbing means for handling refractory bricks for producing an inner refractory lining of a metallurigical vessel, such as a convertor; and the present invention will be described in more detail with reference to this preferred application.

It is known that the refractory lining of a convertor has to be repaired very frequently, i.e., at least once every three weeks. Until now, this very laborious and tiring job has always been carried out manually in spite of several attempts at automation. It will be appreciated that the use of robots to carry out this brick laying work can be considered only if it permits the preclusion of practically all manual involvement; and if the work rate is at least as fast as in manual laying. However, not only are the movements necessary for picking up the bricks from the pallets and placing them in the required position already complicated per se; but, in addition, there are usually two different types of bricks, thus making automation even more complicated. In fact, it will be appreciated that, in order for bricks to be laid in a circle, the bricks must have a trapezoidal shape, that is, the extensions of their longitudinal sides must converge towards the central axis of the convertor. Moreover, because it is impossible to make bricks to measure, there is usually a stack or two or more standard types of bricks of differing conicity; and wherever the bricks laid diverge too much from the shape of the wall of the convertor, the type of brick is changed. Because of all these complications, it has not yet been possible or practical to carry out brick laying operations by means of a robot.

SUMMARY OF THE INVENTION

The above-discussed and other problems and deficiencies of the prior art are overcome or alleviated by the present invention, an object of which is to provide an automatic grabbing device for handling articles and a robot equipped with said grabbing device. The grabbing device and robot equipped with the same is particularly well suited for the automatic laying of refractory bricks on the inner wall of a metallurigical vessel.

In accordance with the present invention, the grabbing means is mounted on the end of a control arm and comprises a plate having a pair of claws associated therewith. The claws are mounted in facing relation, with one claw being slidably mounted on the plate and the other claw being pivotably mounted on the plate. An important feature of the present invention is that the fastening means between the arm and the plate comprises a first and a second pivot axis which are parallel to one another and perpendicular to the surface of the plate. Other significant features of the present invention include means for pivoting the plate about at least one of the pivot axes, means for blocking or releasing the plate relative to the other of the pivot axes, and sensors for measuring the pivoting angle of the plate about each of the axes. The plate is preferably displaceable parallel to its pivot axes, that is, perpendicularly to its main surface. The fastening means preferably comprises a third pivot axis at right-angles to the first and second pivot axes, as well as a motor for pivoting the plate about this third axis and a sensor for measuring the angular position of the plate about the third axis in relation to a reference plane. Each claw is equipped with at least one contact sensor for determining if an article has been grasped correctly.

The plate has, on at least one of the longitudinal sides, at least one fold-down segment displaceable longitudinally together with the sliding claw and is also equipped with at least one sensor. The plate is preferably provided with radiation-type or mechanically acting range finder. The pivoting claw is preferably mounted on two pivoting levers, in order to reduce the faces necessary for the movement of this claw.

For the purposes of using it to repair convertors, the grabbing means of the present invention is preferably designed so as to be capable of grasping and laying two superimposed bricks at the same time, thereby increasing its work rate.

The above-described and other features and advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
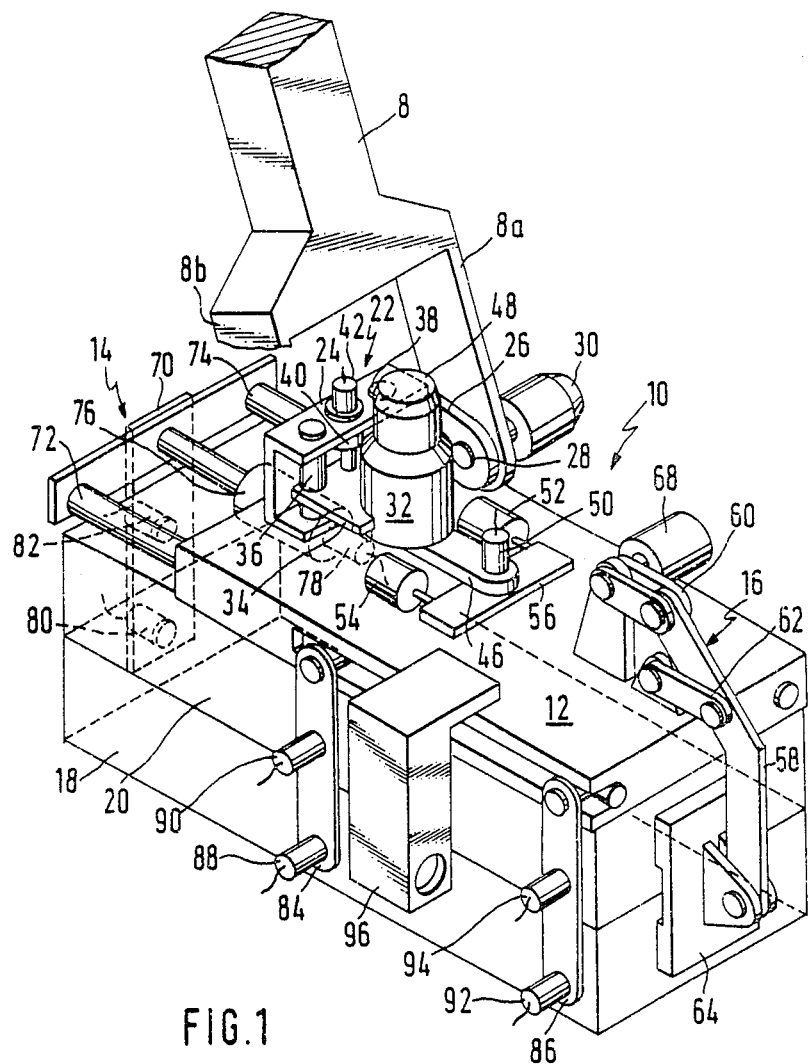
FIG. 1 is a perspective view of an automatic grabbing device in accordance with the present invention.

In FIG. 1, a grabbing device in accordance with the present invention is shown generally to 10. Grabbing device 10 is mounted on the end of an arm 8 of a robot or any other handling appliance. Grabbing device 10 includes a plate 12 which, in the illustrated embodiment, has a rectangular form and which is equipped, on the two opposite short sides, with two claws 14 and 16 for holding an article. In the example shown in FIG. 1, the article between claws 14 and 16 are two superimposed bricks 18 and 20. The end of arm 8 is configured, for example, as a fork with two branches 8a and 8b; branch 8b being shown only partially so as not to hide other elements. Grabbing device 10 is mounted between the two branches 8a and 8b by means of a cradle 22 consisting of a support piece 24 having a U-shaped cross-section with two identical side cheeks, of which only the cheek 26 is visible; while the other cheek (opposite cheek 26), has not been shown to avoid confusing the drawings. Cheeks 26 are mounted pivotally between branches 8a and 8b by means of pivots 28. One of these pivots 28 forms part of the shaft of a motor, for example an electric stepping motor 30, so that it is possible to rotate cradle 22 about the axis of suspension pivot 28. Motor 30 has a sensor for measuring the angular position of cradle 22 and of plate 10 in reaction to a reference axis or plane, for example, the longitudinal axis of arm 8.

Between the two cheeks 26 of cradle 22 is located a housing 32 equipped with a flange 34 retained by means of two rods 36 between the two branches of support piece 24. A motor 40 (for example an electric motor), or a jack permits flange 34 and housing 32 to move along the rods 36 and 38 within support piece 24. The movement of housing 32 perpendicular to pivot 28 is monitored by a sensor 42. The arrangement is preferably such that the central axis of the cylindrical housing 32 is perpendicular to pivot 28.

Located inside housing 32 are bearings 44 (see FIG. 2) arranged about a shaft passing coaxially through housing 32 and forming the vertical branch of an L-shaped connecting rod 46. Connecting rod 46 can be rotated about the vertical axis $Y_1$ of housing 32 by means of a motor 38 mounted on housing 32 and associated with a sensor (not shown) for measuring and monitoring the rotation of the connecting rod 46 about the axis of housing 32.

Plate 12 is pivotally mounted on the end of the horizontal branch of connecting rod 46, so as to be capable of rotating relative to connecting rod 46 about an axis $Y_2$ parallel to the axis of rotation of connecting rod 46 in housing 32. The pivoting of plate 12 relative to connecting rod 46 is measured and monitored by a sensor 50. However, this pivoting capacity can be impeded by two small jacks 52 and 54 which are integral with connecting rod 46. When the rods of jacks 52 and 54 are extended, they bear on a cross-member 56 fixed to plate 12.

Thus, when the rods of jacks 52 and 54 are retracted, plate 12 possesses four degrees of freedom relative to arm 8, including two parallel pivot axes $Y_1$, $Y_2$ perpendicular to the surface of the plate, a horizontal pivot axis formed by suspension 28 in branches 8a and 8b, and the possibility of movement perpendicular to the main surface under the action of jack 40.

Figure 4:
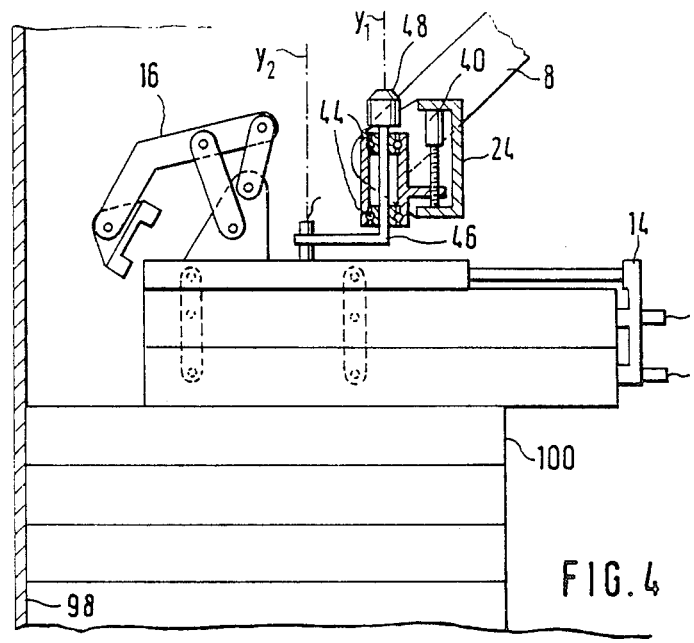
FIG. 4 is a front elevation view of the grabbing device of FIG. 1 during another phase in the operation of laying a pair of superimposed bricks.

Pivoting claw 16 comprises a main arm 58 mounted on plate 12 by means of two pivoting levers 60 and 62. The end of arm 58 carries a pivoting jaw 64 which makes it possible to grasp two superimposed bricks. Jaw 64, on its inside surface, comprises two contact sensors (not shown) similar to contact sensors 80, 82 on claw 14. Claw 16 is actuated by means of a motor 68 (for example an electric motor), acting on one of the levers, (in this particular case lever 60), in order to move the jaw between a closed position and an open position (see FIG. 4). The presence of two pivoting levers 60 and 62 makes it possible to superimpose a translational movement on the rotational movement, to reduce the space necessary for the opening of the claw 16 and thus make is possible to advance the bricks 18 and 20 as near as possible to a wall, as illustrated in FIG. 4.

The second claw 14, which is a sliding claw, comprises a flat jaw 70 fastened to rods 72 and 74 which can slide longitudinally in plate 12 under the action of a motor or a jack 76. The action of motor or jack 76 is similarly under the control of a position sensor 78. In the same way, jaw 70 is equipped with two contact sensors 80 and 82 which monitor the correct closure of sliding claw 14.

It will be appreciated that the two claws 14 and 16 can be replaced easily and quickly by corresponding claws designed to pick up a single brick or three or more bricks if required.

Plate 12 further comprises, at least on one of the longitudinal sides, at least one and preferably two positioning segments 84 and 86. Segments 84 and 86 are mounted on rods 72 and/or 74 supporting the sliding claw 14 and can be shifted longitudinally together with the latter. Moreover, segments 84 and 86 are mounted pivotally on these rods so as to be displaceable, under the action of automatic means (not shown), between the position shown in FIG. 1 and a horizontal position along the cheek of plate 12. Like all the moving parts of grabbing device 10, segments 84 and 86 are equipped with sensors 88, 90, 92 and 94 for monitoring the correct positioning of the plate relative to the bricks 18, 20, and vice versa.

Grabbing device 10 is also provided with a radiation-type rangefinder 96 (known per se) for measuring the distance separating the grabbing device from a wall, for example the wall of the convertor. Rangefinder 96 operates with a divergent beam, in contrast to a point source which, by aiming at a particular point on a surface, can give rise to errors if this surface is not completely smooth. This distance can also be measured by means of a mechanical contact sensor.

Figure 5:
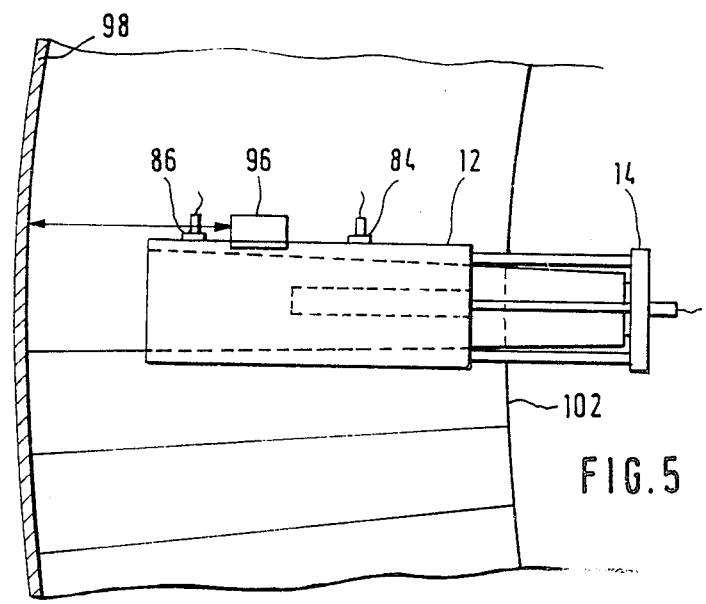
FIG. 5 is a plan view of the grabbing device of FIG. 4.

All the sensors and detectors with which grabbing means 10 is equipped are connected by connecting means (not shown) to a central data-processing unit; the movements to be executed by grabbing device 10 and the associated robot being controlled automatically as a function of this data. These movements will now be described below with reference to FIGS. 2 and 5.

Figure 2:
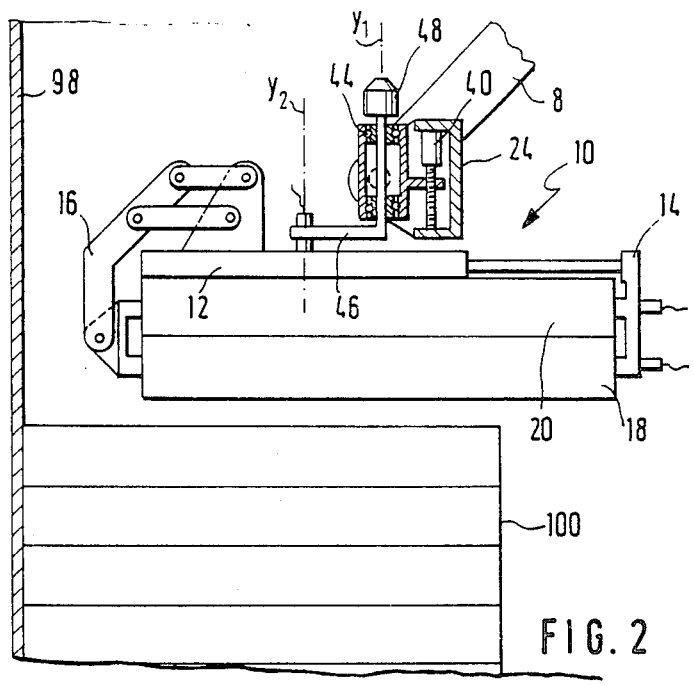
FIG. 2 is a front elevation view of the grabbing device of FIG. 1 during a phase in the operation of laying a pair of superimposes bricks.

The robot brings the bricks automatically into the position shown in FIG. 2, from pallets located on a platform of a work station in the convertor (which is not shown in the FIG.). However, work stations of this are disclosed in U.S. Patent application Ser. No. 915,635, now U.S. Pat. No. 4,708,562, assigned to the assignee hereof and incorporated herein by reference. The robot is programmed by computer as a function of the location of the pallets and the arrangement of the bricks thereon, so that it picks up the bricks automatically according to a predetermined depalletization program. The robot is also programmed to automatically make a selection between the two pallets in order to pick up the appropriate type of brick, this brick selection being a function of the measurements made during preceding laying operations.

It may happen that some bricks are stuck together on the pallets. To avoid picking up more than two bricks at the same time and to prevent a brick from falling during transport, the bricks are disengaged at the time they are picked up from the pallets. For this purpose, grabbing device 10 is positioned so as to grasp a pair of superimposed bricks, claw 16 being in the closed position, while claw 14 is extended sufficiently for lower plate 12 onto the upper brick. When the grabbing means is thus in place, the sliding claw 14 is retracted until its sensors 80 and 82 detect contact with each of the bricks. Claw 14 is subsequently retracted even further, with grabbing device 10 remaining stationary. As a result of this movement, the two bricks are shifted in the direction of jaw 64 of claw 16 and are disengaged from the brick located underneath them (if they were stuck to this previously). Sliding claw 14 is stopped automatically when each of the two sensors located in jaw 64 of claw 16 signals contact with each of the bricks. Another possibility of disengaging the bricks is to increase the mass of claw 14, so that during its closure, a shock effect is generated which detaches the upper brick or upper bricks as a result of the inertia of the lower brick. Yet another possibility, which, if appropriate, can be combined with one of those mentioned above, is to equip claw 14 with a vibrator.

When the two bricks are grasped correctly in grabbing means 10, the robot brings them into the position shown in FIG. 2 which illustrates part of a wall 98 of a convertor, inside of which a refractory lining 100 consisting of superimposed bricks is being laid.

In accordance with one of the particularly important features of the present invention, the function of depalletizing and transporting the bricks, on the one hand, and function of laying the bricks in place, on the other hand, have been separated. In other words, arm 12 of the robot brings the bricks automatically up to a specific reference point, from which laying is carried out by means of the grabbing device 10 which executes most of the movements relative to this reference point. This reference point can, for example, be the point 0 shown in FIG. 2, forming the intersection between the horizontal suspension axis between branches 8a and 8b of arm 8 and the vertical pivot axis of connecting rod 46 in housing 32. This reference point 0 will be at predetermined distances from wall 98, from the upper surface of lining 100 already laid and from the brick or pair of adjacent bricks 102 previously put down. The distance from wall 98 will be determined so that it is possible to open pivoting claw 16. The vertical distance from the upper surface of lining 100 will be determined so that the height separating this surface from lower brick 18 is less than the thickness of one brick, so as to prevent the upper brick 20 from catching on the adjacent brick 102 when it is lowered and when the upper brick 20 is not positioned perfectly on the lower brick 18.

Figure 3:
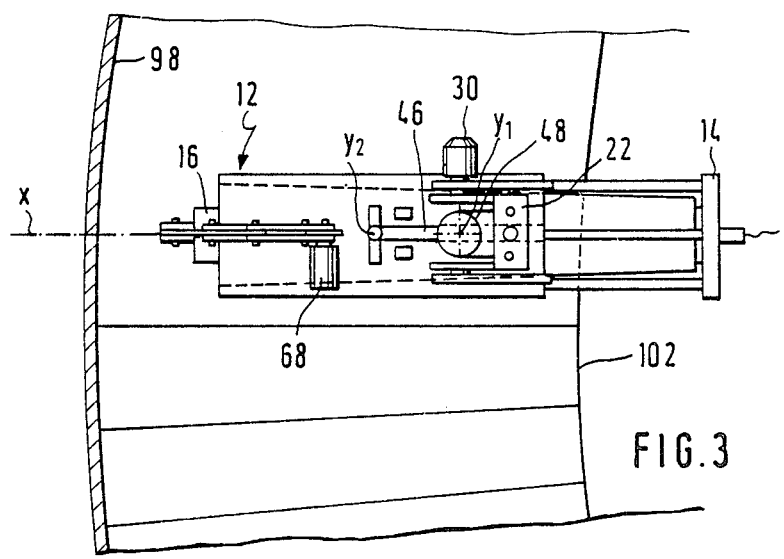
FIG. 3 is a plan view of the grabbing device of FIG. 2.

The reference point 0 thus determined theoretically in space is recalculated after each laying of a pair of bricks, in particular as a function of the measurements supplied by the sensors detecting the positioning and type of bricks laid. The robot control program takes these corrections into account, in order to bring grabbing device 10 each time into the reference position calculated in this way. FIGS. 2 and 3 show grabbing means 10 with a pair of bricks 18 and 20 occupying the reference position. In this position, the longitudinal center axis represented by X in FIG. 3 passes approximately through the vertical center axis (not shown) of the convertor. The first phase involves actuating the motor 48 in order to rotate connecting rod 46 in the counter clockwise direction, as shown in FIG. 3. Since plate 12 is blocked by jacks 52 and 54 relative to connecting rod 46, the latter rotates the plate 12 together with the bricks about the vertical axis $Y_1$, until the outer corner of the bricks comes in contact with the adjacent brick 102. The amount of this pivoting up to contact with the adjacent brick 102 is measured by the sensor associated with motor 48. The resistance to continued pivoting is detected automatically by motor 48, and under the control of the motor, the rods of jacks 52 and 54 are retracted so as to free the pivot axis between plate 12 and connecting rod 46 (represented by $Y_2$ in FIGS. 2 and 3). The continued pivoting of connecting rod 46 under the action of motor 48 consequently produces a rotation of plate 12 and bricks 18, 20 in the clockwise direction about the vertical axis $Y_2$, until the two bricks touch the adjacent brick 102 over its entire length. The amount of pivoting about $Y_2$ of this second phase, detected by sensor 50, must theoretically correspond approximately to the amount of pivoting about the axis $Y_1$ of the first phase. If the amounts of these successive pivotings about the axes $Y_1$ and $Y_2$ are no longer equal or exceed a predetermined tolerance, that means that the brick 102 is no longer oriented correctly on the central axis of the convertor and that the curving direction followed by the bricks diverges from the curve of the wall 98 of the convertor. This information is used to order the robot automatically to change the type of bricks in order to restore the laying curve.

Instead of executing the pivoting about axes $Y_1$ and $Y_2$ in a controlled manner by releasing jacks 52 and 54 only after the first pivoting phase about the axis $Y_1$, it is possible to release plate 12 as a result of the retraction of the jacks as soon as grabbing means 10 is in the reference position. In this case, the rotating phases about the axes $Y_1$ and $Y_2$ can take place simultaneously or in reverse order, but the final result, as described above, will be the same; that is, a comparison between the amounts of pivoting about the two axes $Y_1$ and $Y_2$ gives an indication of the correct positioning of the bricks.

Grabbing means 10, after being shifted laterally against brick 102 in this way, is lowered onto the surface of lining 100 under the action of motor 40. As soon as the bricks are supported on lining 100, this being detected automatically by the motor 40, pivoting claw 16 is opened under the action of motor 68, as shown in FIG. 4. At this stage, the intention is to lower segments 84, 86 which have, up until now, been in the raised position along plate 12. However, it is not certain that these segments can be folded down towards the position shown in FIG. 1, since it is possible that, when the bricks 18 and 20 were picked up from the pallet, they were grasped in such a way that the upper edge of brick 20 projects beyond the longitudinal edge of plate 12 on the same side as segments 84 and 86. To avoid this possibility, the plate, from which the bricks have been removed as a result of the opening of the claws, is first pivoted slightly in the clockwise direction in FIGS. 3 and 5 as a result of a rotation of the connecting rod in the opposite direction to its preceding rotation. After the segments 84 and 86 have been folded down into the position shown in FIG. 1, the plate 12 is pivoted once again, under the action of motor 48 and the connecting rod 46, in the counter clockwise direction in FIG. 5, until segments 84 and 86 are in contact with the lateral faces of bricks 18 and 20, this being detected by sensors 88, 90, 92 and 94.

At this moment, motor 76 is acutated in order to retract the sliding claw 14 into plate 12 and thereby push bricks 18 and 20 against wall 98. The two segments 84 and 86 which advance together with the sliding claw 14 are intended to guide the two bricks and, during this sliding, keep them, in previously determined contact with the adjacent brick 102. The two bricks are advanced in this way, until they occupy the final position either against the wall 98 or at a certain distance from it.

Because the initial reference point 0 was determined as a function of the final position of the pair of bricks, the amount of movement of sliding claw 14 should, in theory, always be the same; the distance covered being monitored by sensor 78 which automatically controls the stopping of motor 76 according to the initial program. However, in order to monitor the final positioning of the bricks, when the bricks are pushed towards the wall, rangefinder 96 measures the distance separating the bricks from the wall and thus checks the bricks approach to the wall. Rangefinder 96 can thus control the premature stopping of motor 76 if the bricks are in the final position before the position determined by the program. Likewise, if, at the programed stopping of claw 14, the bricks are still too far from wall 98, rangefinder 96 can command the continuation of the movement of claw 14 and transmit corresponding data to the central unit, in order to consequently modify the calculation of the reference point for the next laying.

As soon as the two bricks 18 and 20 occupy their final position, the robot returns towards the pallets to pick up a new pair of bricks. During this movement, claw 16 is closed while claw 14 is open because plate 12 has been cleared.

It may be advantageous to combine grabbing device 10 with a cleaning device, for example, a suction-type or blower-type cleaner with or without brushes, which is acutated as soon as grabbing means 10 has reached its reference point or even during the approach.

While preferred embodiments have been shown and described, various modifications and substitutions may be made thereto without departing from the spirit and scope of the invention. Accordingly, it is to be understood that the present invention has bend described by way of illustrations and not limitation.

What is claimed is:

1. An automatic grabbing device for handling articles, the grabbing device being adapted for mounting on the end of a control arm, comprising:
   plate means;
   a pair of claw means mounted in facing relation on said plate means, one of said claw means being slidably movable on said plate means and the other of said claw means being pivotably movable on said plate means;
   fastening means for articulating a control arm to said plate means, said fastening means comprising;
   a first and a second spaced mutually parallel pivot axis communicating with a surface of said plate means, said pivot axes being perpendicular to said surface of said plate means;
   means for pivoting said plate means about said first or second pivot axes;
   means for blocking or releasing said plate means relative to the other of said first or second pivot axes; and
   sensor means for measuring the pivoting angle of said plate means about each of said pivot axes.

2. The device according to claim 1 including:
   means for shifting said plate means parallel to said pivot axes.

3. The device according to claim 1 wherein said fastening means further includes:
   a third pivot axis perpendicular to said first and second pivot axes;
   means for pivoting said plate means about said third axis; and
   sensor means for measuring the angular position of said plate means about said third axis in relation to a reference plane.

4. The device according to claim 1 wherein each claw means includes:
   at least one contact sensor for determining if an article has been grasped correctly.

5. The device according to claim 1 wherein said plate means comprises:
   at least one folddown segment displaceable longitudinally together with said sliding claw means and including at least one sensor means on at least one of the longitudinal sides.

6. The device according to claim 1 wherein said plate means includes:
   rangefinder means for measuring the distance between said plate means and a wall.

7. The device according to claim 1 wherein; said pivoting claw means is mounted on two pivoting levers.

8. The device according to claim 1 wherein:
   said claw means are adapted to grasp a single brick.

9. The device according to claim 1 wherein:
   said claw means are adapted to grasp two bricks.

10. The device according to claim 1 including:
    robot means connected to a control arm; and
    wherein said fastening means is articulated between said control arm and said plate means.

11. An automatic grabbing device for handling refractory bricks and for producing an inner refractory lining along a metallurgical vessel, the grabbing device being adapted for mounting on the end of a control arm, comprising:
    plate means,
    a pair of claw means mounted in facing relation on said plate means, one of said claw means being slidably moveable on said plate means and the other of said claw means being pivotably movable on said plate means;
    fastening means for articulating a control arm to said plate means, said fastening means comprising;
    a first and a second spaced mutually parallel pivot axis communicating with a surface of said plate means, said pivot axis being perpendicular to said surface of said plate means;
    means for pivoting said plate means about said first or second pivot axes;
    means for blocking or releasing said plate means relative to the other of said first or second pivot axes; and
    sensor means for measuring the pivoting angle of said plate means about each of said pivot axes.

12. The device according to claim 11 including:
    means for shifting said plate means parallel to said pivot axes.

13. The device according to claim 11 wherein said fastening means further includes:
    a third pivot axis perpendicular to said first and second pivot axes;
    means for pivoting said plate means about said third axis; and
    sensor means for measuring the angular position of said plate means about said third axis in relation to a reference plane.

14. The device according to claim 11 wherein each claw means includes:
    at least one contact sensor for determining if an article has been grasped correctly.

15. The device according to claim 11 wherein said plate means comprises:
    at least one folddown segment displaceable longitudinally together with said sliding claw means and including at least one sensor means on at least one of the longitudinal sides.

16. The device according to claim 11 wherein said plate means includes:

rangefinder means for measuring the distance between said plate means and a wall.

17. The device according to claim 11 wherein: said pivoting claw means is mounted on two pivoting levers.

18. The device according to claim 11 wherein: said claw means are adapted to grasp a single brick.

19. The device according to claim 11 wherein: said claw means are adapted to grasp two bricks.

20. The device according to claim 11 including: robot means connected to a control arm; and wherein said fastening means is articulated between said control arm and said plate means.

* * * * *